(12) United States Patent
Vobbilisetty et al.

(10) Patent No.: US 9,401,872 B2
(45) Date of Patent: Jul. 26, 2016

(54) VIRTUAL LINK AGGREGATIONS ACROSS MULTIPLE FABRIC SWITCHES

(71) Applicant: BROCADE COMMUNICATIONS SYSTEMS, INC., San Jose, CA (US)

(72) Inventors: Suresh Vobbilisetty, San Jose, CA (US); Phanidhar Koganti, Hyderabad (IN)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 202 days.

(21) Appl. No.: 14/064,029

(22) Filed: Oct. 25, 2013

(65) Prior Publication Data

US 2014/0140199 A1   May 22, 2014

Related U.S. Application Data

(60) Provisional application No. 61/727,478, filed on Nov. 16, 2012.

(51) Int. Cl.
*H04L 12/28* (2006.01)
*H04L 12/947* (2013.01)
*H04L 12/24* (2006.01)
(Continued)

(52) U.S. Cl.
CPC ............ *H04L 49/25* (2013.01); *H04L 12/4625* (2013.01); *H04L 41/0654* (2013.01); *H04L 45/245* (2013.01); *H04L 45/66* (2013.01); *H04L 49/10* (2013.01); *H04L 49/15* (2013.01); *H04L 49/3009* (2013.01); *H04L 49/70* (2013.01); *H04L 45/583* (2013.01); *Y02B 60/33* (2013.01)

(58) Field of Classification Search
CPC ........................................................ H04L 49/25
USPC ........................................................... 370/217
See application file for complete search history.

(56) References Cited

U.S. PATENT DOCUMENTS 829,529 A   8/1906 Keathley
5,390,173 A   2/1995 Spinney
(Continued)

FOREIGN PATENT DOCUMENTS

EP   0579567   5/1993
EP   0579567 A2   1/1994
(Continued)

OTHER PUBLICATIONS

Office action dated Mar. 4, 2013, U.S. Appl. No. 13/092,877, filed Apr. 22, 2011.
(Continued)

*Primary Examiner* — Christopher R Crompton
(74) *Attorney, Agent, or Firm* — Shun Yao; Park, Vaughan, Fleming & Dowler LLP

(57) ABSTRACT

One embodiment of the present invention provides a switch. The switch is configurable to be a member of a first fabric switch. The switch includes a link aggregation module. During operation, the link aggregation module marks an ingress-switch field of a frame with a virtual switch identifier. This virtual switch identifier is associated with the switch and a second switch, which is a member of a second fabric switch, and is from a range of identifier associated with the first fabric switch and the second fabric switch. Each of the first fabric switch and the second fabric switch is operable to accommodate a plurality of switches and operate as a single switch.

18 Claims, 12 Drawing Sheets

(51) Int. Cl.
*H04L 12/721* (2013.01)
*H04L 12/709* (2013.01)
*H04L 12/933* (2013.01)
*H04L 12/931* (2013.01)
*H04L 12/46* (2006.01)
*H04L 12/935* (2013.01)
*H04L 12/775* (2013.01)

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,959,968 A | 9/1999 | Chin |
| 5,973,278 A | 10/1999 | Wehrill, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |

(56) References Cited

U.S. PATENT DOCUMENTS

| | | |
|---|---|---|
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | Lavigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi et al. |
| 2009/0327462 A1 | 12/2009 | Adams |
| 2009/0328392 A1 | 12/2009 | Tripathi |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1* | 9/2010 | Gupta ............... H04L 12/4625 370/225 |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |

(56) References Cited

U.S. PATENT DOCUMENTS

| | | | |
|---|---|---|---|
| 2010/0329110 A1 | 12/2010 | Rose | |
| 2011/0019678 A1* | 1/2011 | Mehta | H04L 12/4625 370/401 |
| 2011/0032945 A1 | 2/2011 | Mullooly | |
| 2011/0035489 A1 | 2/2011 | McDaniel | |
| 2011/0035498 A1 | 2/2011 | Shah | |
| 2011/0044339 A1 | 2/2011 | Kotalwar | |
| 2011/0044352 A1 | 2/2011 | Chaitou | |
| 2011/0064086 A1 | 3/2011 | Xiong | |
| 2011/0064089 A1 | 3/2011 | Hidaka | |
| 2011/0072208 A1 | 3/2011 | Gulati | |
| 2011/0085560 A1 | 4/2011 | Chawla | |
| 2011/0085563 A1 | 4/2011 | Kotha | |
| 2011/0110266 A1 | 5/2011 | Li | |
| 2011/0134802 A1 | 6/2011 | Rajagopalan | |
| 2011/0134803 A1 | 6/2011 | Dalvi | |
| 2011/0134925 A1 | 6/2011 | Safrai | |
| 2011/0142053 A1 | 6/2011 | Van Der Merwe | |
| 2011/0142062 A1 | 6/2011 | Wang | |
| 2011/0161494 A1 | 6/2011 | McDysan | |
| 2011/0161695 A1 | 6/2011 | Okita | |
| 2011/0176412 A1 | 7/2011 | Stine | |
| 2011/0188373 A1 | 8/2011 | Saito | |
| 2011/0194403 A1 | 8/2011 | Sajassi | |
| 2011/0194563 A1 | 8/2011 | Shen | |
| 2011/0228780 A1 | 9/2011 | Ashwood-Smith | |
| 2011/0231570 A1 | 9/2011 | Altekar | |
| 2011/0231574 A1 | 9/2011 | Saunderson | |
| 2011/0235523 A1* | 9/2011 | Jha | H04L 45/66 370/242 |
| 2011/0243133 A9 | 10/2011 | Villait | |
| 2011/0243136 A1 | 10/2011 | Raman | |
| 2011/0246669 A1 | 10/2011 | Kanada | |
| 2011/0255538 A1 | 10/2011 | Srinivasan | |
| 2011/0255540 A1 | 10/2011 | Mizrahi | |
| 2011/0261828 A1 | 10/2011 | Smith | |
| 2011/0268120 A1 | 11/2011 | Vobbilisetty | |
| 2011/0268125 A1 | 11/2011 | Vobbilisetty | |
| 2011/0273988 A1 | 11/2011 | Tourrilhes | |
| 2011/0274114 A1 | 11/2011 | Dhar | |
| 2011/0280572 A1 | 11/2011 | Vobbilisetty | |
| 2011/0286457 A1 | 11/2011 | Ee | |
| 2011/0296052 A1 | 12/2011 | Guo | |
| 2011/0299391 A1 | 12/2011 | Vobbilisetty | |
| 2011/0299413 A1 | 12/2011 | Chatwani | |
| 2011/0299414 A1 | 12/2011 | Yu | |
| 2011/0299527 A1 | 12/2011 | Yu | |
| 2011/0299528 A1 | 12/2011 | Yu | |
| 2011/0299531 A1 | 12/2011 | Yu | |
| 2011/0299532 A1 | 12/2011 | Yu | |
| 2011/0299533 A1 | 12/2011 | Yu | |
| 2011/0299534 A1 | 12/2011 | Koganti | |
| 2011/0299535 A1 | 12/2011 | Vobbilisetty | |
| 2011/0299536 A1* | 12/2011 | Cheng | H04L 12/4625 370/392 |
| 2011/0317559 A1 | 12/2011 | Kern | |
| 2011/0317703 A1 | 12/2011 | Dunbar et al. | |
| 2012/0011240 A1 | 1/2012 | Hara | |
| 2012/0014261 A1 | 1/2012 | Salam | |
| 2012/0014387 A1 | 1/2012 | Dunbar | |
| 2012/0020220 A1 | 1/2012 | Sugita | |
| 2012/0027017 A1 | 2/2012 | Rai | |
| 2012/0033663 A1 | 2/2012 | Guichard | |
| 2012/0033665 A1 | 2/2012 | Jacob Da Silva et al. | |
| 2012/0033668 A1 | 2/2012 | Humphries | |
| 2012/0033669 A1 | 2/2012 | Mohandas | |
| 2012/0033672 A1 | 2/2012 | Page | |
| 2012/0063363 A1 | 3/2012 | Li | |
| 2012/0075991 A1 | 3/2012 | Sugita | |
| 2012/0099567 A1 | 4/2012 | Hart | |
| 2012/0099602 A1 | 4/2012 | Nagapudi | |
| 2012/0106339 A1 | 5/2012 | Mishra | |
| 2012/0117438 A1 | 5/2012 | Shaffer | |
| 2012/0131097 A1 | 5/2012 | Baykal | |
| 2012/0131289 A1 | 5/2012 | Taguchi | |
| 2012/0134266 A1 | 5/2012 | Roitshtein | |
| 2012/0147740 A1 | 6/2012 | Nakash | |
| 2012/0158997 A1 | 6/2012 | Hsu | |
| 2012/0163164 A1 | 6/2012 | Terry | |
| 2012/0177039 A1 | 7/2012 | Berman | |
| 2012/0210416 A1 | 8/2012 | Mihelich | |
| 2012/0243539 A1 | 9/2012 | Keesara | |
| 2012/0275297 A1 | 11/2012 | Subramanian | |
| 2012/0275347 A1 | 11/2012 | Banerjee | |
| 2012/0278804 A1 | 11/2012 | Narayanasamy | |
| 2012/0294192 A1 | 11/2012 | Masood | |
| 2012/0294194 A1 | 11/2012 | Balasubramanian | |
| 2012/0320800 A1 | 12/2012 | Kamble | |
| 2012/0320926 A1 | 12/2012 | Kamath et al. | |
| 2012/0327766 A1 | 12/2012 | Tsai et al. | |
| 2012/0327937 A1 | 12/2012 | Melman et al. | |
| 2013/0003535 A1 | 1/2013 | Sarwar | |
| 2013/0003737 A1 | 1/2013 | Sinicrope | |
| 2013/0003738 A1 | 1/2013 | Koganti | |
| 2013/0028072 A1 | 1/2013 | Addanki | |
| 2013/0034015 A1 | 2/2013 | Jaiswal | |
| 2013/0034021 A1 | 2/2013 | Jaiswal | |
| 2013/0067466 A1 | 3/2013 | Combs | |
| 2013/0070762 A1 | 3/2013 | Adams | |
| 2013/0114595 A1 | 5/2013 | Mack-Crane et al. | |
| 2013/0114600 A1* | 5/2013 | Koganti | H04L 49/357 370/392 |
| 2013/0124707 A1 | 5/2013 | Ananthapadmanabha | |
| 2013/0127848 A1 | 5/2013 | Joshi | |
| 2013/0136123 A1 | 5/2013 | Ge | |
| 2013/0148546 A1 | 6/2013 | Eisenhauer | |
| 2013/0194914 A1 | 8/2013 | Agarwal | |
| 2013/0219473 A1 | 8/2013 | Schaefer | |
| 2013/0250951 A1 | 9/2013 | Koganti | |
| 2013/0259037 A1 | 10/2013 | Natarajan | |
| 2013/0272135 A1 | 10/2013 | Leong | |
| 2013/0294451 A1 | 11/2013 | Li | |
| 2013/0301642 A1 | 11/2013 | Radhakrishnan | |
| 2013/0346583 A1 | 12/2013 | Low | |
| 2014/0013324 A1 | 1/2014 | Zhang | |
| 2014/0025736 A1 | 1/2014 | Wang | |
| 2014/0044126 A1 | 2/2014 | Sabhanatarajan | |
| 2014/0056298 A1 | 2/2014 | Vobbilisetty | |
| 2014/0105034 A1 | 4/2014 | Sun | |
| 2015/0010007 A1 | 1/2015 | Matsuhira | |
| 2015/0030031 A1 | 1/2015 | Zhou | |
| 2015/0143369 A1 | 5/2015 | Zheng | |

FOREIGN PATENT DOCUMENTS

| | | |
|---|---|---|
| EP | 0993156 A2 | 12/2000 |
| EP | 1398920 A2 | 3/2004 |
| EP | 2001167 A1 | 8/2007 |
| EP | 1916807 A2 | 10/2007 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office action dated Sep. 5, 2013, U.S. Appl. No. 13/092,877, filed Apr. 22, 2011.

Office action dated Jan. 6, 2014, U.S. Appl. No. 13/092,877, filed Apr. 22, 2011.

Office action dated Jun. 20, 2014, U.S. Appl. No. 13/092,877, filed Apr. 22, 2011.

Office action dated Jun. 7, 2012, U.S. Appl. No. 12/950,968, filed Nov. 19, 2010.

Office action dated Jan. 4, 2013, U.S. Appl. No. 12/950,968, filed Nov. 19, 2010.

Office action dated Sep. 19, 2012, U.S. Appl. No. 13/092,864, filed Apr. 22, 2011.

Office action dated May 31, 2013, U.S. Appl. No. 13/098,360, filed Apr. 29, 2011.

Office action dated Oct. 2, 2013, U.S. Appl. No. 13/044,326, filed Mar. 9, 2011.

(56) References Cited

OTHER PUBLICATIONS

Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
Huang, Nen-Fu et al. "An Effective Spanning Tree Algorithm for a Bridged LAN", Mar. 16, 1992.
Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and TurbuIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) September, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Apr. 9, 2014, U.S. Appl. No. 13/092,724, filed Apr. 22, 2011.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Mar. 14, 2014, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Mar. 26, 2014, U.S. Appl. No. 13/092,701, filed Apr. 22, 2011.
Office action dated Feb. 5, 2013, U.S. Appl. No. 13/092,752, filed Apr. 22, 2011.

(56) References Cited

OTHER PUBLICATIONS

Office action dated Jul. 18, 2013, U.S. Appl. No. 13/092,752, filed Apr. 22, 2011.
Office action dated Apr. 9, 2014, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action for U.S. Appl. No. 13/030,688, filed Feb. 18, 2011, dated Jul. 17, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010 dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/087,239, Filing date Apr. 14, 2011, dated Dec. 5, 2012.
Office Action for U.S. Appl. No. 13/365,808, filed Jul. 18, 2013, dated Jul. 18, 2013.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
BROCADE Brocade Unveils The Effortless Network , http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 12/950,974, filed Nov. 19, 2010, dated Dec. 20, 2012.
Office Action for U.S. Appl. No. 13/092,877, filed Apr. 22, 2011, dated Sep. 5, 2013.
Office Action for U.S. Appl. No. 13/092,887, dated Jan. 6, 2014.
Office Action for U.S. Appl. No. 13/098,490, filed May 2, 2011, dated Mar. 27, 2014.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014

(56) References Cited

OTHER PUBLICATIONS

Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

* cited by examiner

US 9,401,872 B2

VIRTUAL LINK AGGREGATIONS ACROSS MULTIPLE FABRIC SWITCHES

RELATED APPLICATIONS

This application claims the benefit of U.S. Provisional Application No. 61/727,478, titled "Virtual Link Aggregations Across Multiple Fabric Switches," by inventors Suresh Vobbilisetty and Phanidhar Koganti, filed 16 Nov. 2012, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosures of which are incorporated by reference herein.

BACKGROUND

1. Field

The present disclosure relates to network management. More specifically, the present disclosure relates to a method and system for facilitating link aggregation from one device to multiple fabric switches.

2. Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As more mission-critical applications are being implemented in data communication networks, high-availability operation is becoming progressively more important as a value proposition for network architects. It can be desirable to divide a conventional aggregated link (from one device to another) among multiple network devices, often belonging to different fabric switches, such that unavailability of one fabric switch would not affect the operation of the multi-homed device.

While a fabric switch brings many desirable features to a network, some issues remain unsolved when end devices are coupled to multiple fabric switches. Particularly, when an end device is coupled to multiple fabric switches using link aggregation, existing technologies do not provide a scalable and flexible solution that takes full advantage of a fabric switch.

SUMMARY

One embodiment of the present invention provides a switch. The switch is configurable to be a member of a first fabric switch. The switch includes a link aggregation module. During operation, the link aggregation module marks an ingress-switch field of a frame with a virtual switch identifier. This virtual switch identifier is associated with the switch and a second switch, which is a member of a second fabric switch, and is from a range of identifier associated with the first fabric switch and the second fabric switch. Each of the first fabric switch and the second fabric switch is operable to accommodate a plurality of switches and operate as a single switch.

In a variation on this embodiment, the switch also includes a packet processing module which identifies the virtual switch identifier as the egress switch identifier of a frame and, in response, determines that the switch is the egress switch for the frame.

In a variation on this embodiment, the switch also includes a suppression module which identifies the virtual switch identifier as egress switch identifier of a broadcast, unknown unicast, or multicast frame, and, in response, precludes the switch from determining a port associated with a local end device as the output port for the frame.

In a variation on this embodiment, the switch also includes a multicast module which identifies a frame to be a broadcast, unknown unicast, or multicast frame and, in response, mark an egress-switch field of the frame with a virtual root switch identifier. This virtual root switch identifier is associated with respective multicast root switches of the first fabric switch and the second fabric switch.

In a further variation, the switch also includes a failure detection module which, in response to detecting unavailability of the multicast root switch of the first fabric switch, identifies a new multicast root switch and associates the virtual root switch identifier with the new multicast root switch of the first fabric switch.

In a variation on this embodiment, the switch is a routing bridge (RBridge) operable in accordance with Transparent Interconnection of Lots of Links (TRILL) protocol.

In a further variation, the switch also includes a TRILL-supported edge port and a TRILL primary module. The TRILL-supported edge port is operable as an output port for frames destined outside of the first fabric switch. During operation, in response to determining a TRILL-encapsulated frame to be a broadcast, unknown unicast, or multicast frame, the TRILL primary module precludes the switch from removing TRILL encapsulation from the TRILL-encapsulated frame and determines the TRILL-supported edge port as the output port for the TRILL-encapsulated frame.

In a variation on this embodiment, the switch also includes a failure detection module which disassociates the switch from the virtual switch identifier in response to detecting unavailability of the second switch and marks an egress-switch field of a frame, which is received after detecting unavailability of the second switch, with a switch identifier of the local switch.

In a variation on this embodiment, the switch also includes a control module operable, which runs a control plane with automatic configuration capabilities based on a protocol associated with the first fabric switch and operate the first fabric switch as a single Ethernet switch based on the automatic configuration capabilities of the control plane. The control module also receives an automatically assigned identifier corresponding to the Ethernet switch and joins the first fabric switch via the control plane.

One embodiment of the present invention provides a switch. The switch is configurable to be a member of a first fabric switch. The switch includes a link aggregation module. During operation, the link aggregation module operates a first trunked link of the switch in conjunction with a second trunked link of a second switch of the first fabric switch as a virtual link aggregation. The virtual link aggregation is mapped to the switch and the second switch. A second fabric switch is reachable via the first and second trunked links. Each of the first fabric switch and the second fabric switch is operable to accommodate a plurality of switches and operate as a single switch.

In a variation on this embodiment, the virtual link aggregation is mapped to the switch based on a hash function.

In a variation on this embodiment, the switch selects respective output ports of the switch for the frames destined to the second fabric switch such that the frames are distributed across links of the first trunked link, thereby spraying the frames across the links of the first trunked link.

BRIEF DESCRIPTION OF THE FIGURES

In the figures, like reference numerals refer to the same figure elements.

DETAILED DESCRIPTION

Figure 1A:
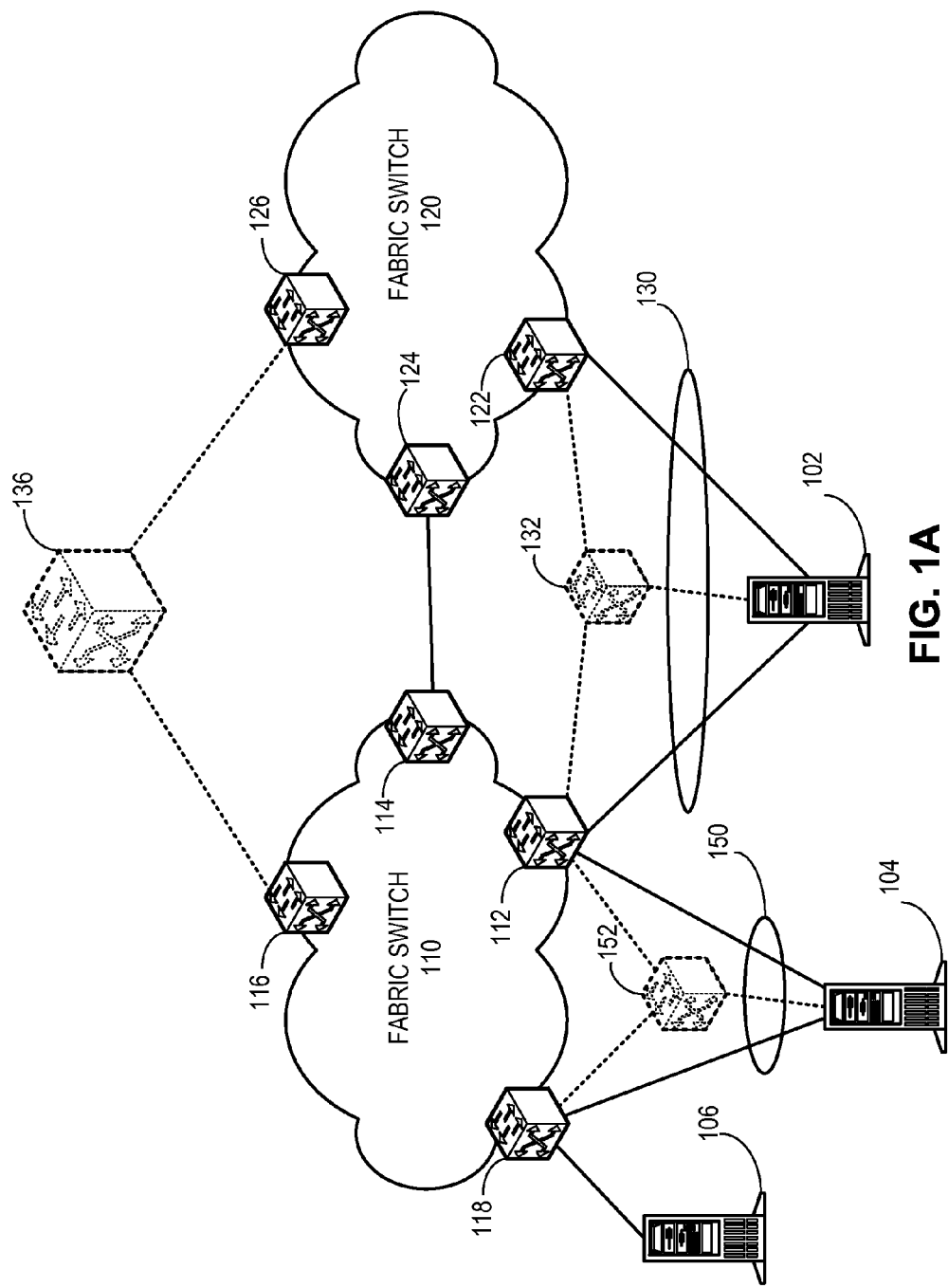
FIG. 1A illustrates an exemplary virtual link aggregation across multiple fabric switches, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing a scalable and flexible way of provisioning a virtual link aggregation across multiple fabric switches is solved by forming a logical, virtual switch and assigning a virtual switch identifier from a global identifier range known to the fabric switches. For example, if the communication within the fabric switches is based on Transparent Interconnection of Lots of Links (TRILL) protocol, when an end device is coupled to two separate routing bridges (RBridges) belonging to two separate fabric switches and the links to these RBridges form an aggregate link, a virtual RBridge identifier (ID) is generated, and the end device is considered to be logically coupled to the virtual RBridge. In the following description, RBridges which participate in a virtual link aggregation and form a virtual RBridge are referred to as "partner RBridges."

If the virtual RBridge identifier associated with the virtual link aggregation is from a local identifier range of a fabric switch, partner RBridges, which are members of other fabric switches, do not recognize that virtual RBridge identifier as its own. As a result, these partner RBridges may not be able to perform operations associated with efficient deployment of a link aggregation, such as source suppression of BUM traffic. Furthermore, to distribute of BUM traffic in a fabric switch, a partner RBridge sets the destination RBridge identifier to be the RBridge identifier of the root RBridge (i.e., the root of a multicast tree) of the fabric switch. In some embodiments, this root RBridge is responsible for distributing BUM traffic in a fabric switch and usually is specific to the fabric switch. Hence, for a virtual link aggregation spanning multiple fabric switches, a fabric-specific root RBridge may not support BUM traffic distribution in the multiple fabric switches.

In embodiments of the present invention, the aforementioned problems are solved by assigning the virtual RBridge identifier, which is associated with a virtual link aggregation spanning multiple fabric switches, from a global identifier range. Identifiers belonging to this global identifier range are known to the multiple fabric switches. This allows partner RBridges in different fabric switches to recognize the same virtual RBridge identifier and perform source suppression for BUM traffic originating from the end device associated with the virtual link aggregation. Furthermore, a virtual root RBridge is created for forwarding BUM traffic in the fabric switches. This virtual root RBridge is associated with the root RBridge of respective fabric switch. A partner RBridge forwards BUM traffic toward the virtual root RBridge, which, in turn, is received by respective root RBridge in respective fabric switch. This enables a respective root RBridge to distribute BUM traffic within corresponding fabric switch.

In some embodiments, the fabric switch is an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a TRILL network and a respective member switch of the fabric switch is a TRILL RBridge.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of a fabric switch, an individual physical switch can dynamically join or leave the fabric switch without disrupting services to the rest of the network.

Furthermore, the automatic and dynamic configurability of a fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

In this disclosure, the term "end device" can refer to a physical or virtual device coupled to a fabric switch. An end device can be a host, a server, a conventional layer-2 switch, a layer-3 router, or any other type of device. Additionally, an end device can be coupled to other switches or hosts further away from a network. An end device can also be an aggregation point for a number of network devices to enter the network. The terms "device" and "machine" are used interchangeably.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an end device outside of the fabric switch. The term "inter-switch port" refers to a port which couples a member switch of a fabric switch with another member switch and is used for exchanging data frames between the member switches.

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID" or "RBridge nickname" or any other format that can identify an RBridge.

The term "dual-homed end device" refers to an end device that has an aggregate link to two or more switches belonging to one or more fabric switches, where the aggregate link includes multiple physical links to the different RBridges. The aggregate link, which includes multiple physical links, functions as one logical link to the end station. Although the term "dual" is used here, the term "dual-homed end device" does not limit the number of physical RBridges sharing the aggregate link to two. In various embodiments, other numbers of physical RBridges can share the same aggregate link. Where "dual-homed end device" is used in the present disclosure, the term "multi-homed end device" can also be used.

Network Architecture

FIG. 1A illustrates an exemplary virtual link aggregation across multiple fabric switches, in accordance with an embodiment of the present invention. As illustrated in FIG. 1A, a fabric switch 110 includes member switches 112, 114, 116, and 118, and a fabric switch 120 includes member switches 122, 124, and 126. In some embodiments, one or more switches in fabric switches 110 and 120 can be virtual switches (e.g., a software switch running on a computing device).

In some embodiments, fabric switches 110 and 120 are TRILL networks and a respective member switch of fabric switches 110 and 120, such as switches 112 and 122, is a TRILL RBridge. RBridges in fabric switches 110 and 120 use edge ports to communicate to end devices and inter-switch ports to communicate to other member switches. For example, RBridge 118 is coupled to end device 106 via an edge ports and to RBridges 112, 114, and 116 via inter-switch ports and one or more links. Communication via an edge port can be based on Ethernet and via an inter-switch port can be based on TRILL protocol. Note that the link between fabric switches 110 and 120 is established via edge ports of switches 114 and 124.

RBridges 112 and 118 are configured to operate in a special "trunked" mode for multi-homed end device 104 and form a virtual link aggregation 150. End device 104 view these partner RBridges 112 and 118 as a common virtual RBridge 152, with a corresponding virtual RBridge identifier. Dual-homed end device 104 is considered to be logically coupled to virtual RBridge 152 via logical links represented by dotted lines. Virtual RBridge 152 is considered to be logically coupled to partner RBridges 112 and 118, optionally with zero-cost links (also represented by dotted lines). Incoming frames from end device 104 is marked with virtual RBridge 152's identifier as their ingress RBridge identifier. As a result, other RBridges in fabric switch 110 can learn that end device 104 is reachable via virtual RBridge 152. Furthermore, RBridges 112 and 118 can advertise their respective connectivity (optionally via zero-cost links) to virtual RBridge 152. Hence, multi-pathing can be achieved when other RBridges choose to send frames to virtual RBridge 152 (which is marked as the egress RBridge in the frames) via partner RBridges 112 and 118.

Since partner RBridges 112 and 118 function as a single logical RBridge 152, the MAC address reachability learned by a partner RBridge is shared with the other partner RBridge. For example, during normal operation, end device 104 may choose to send its outgoing frames only via the link to RBridge 118. As a result, only RBridge 118 learns end device 104's MAC address (and the corresponding port on RBridge 118 to which end device 104 is coupled). This information is then shared by RBridge 118 with RBridge 112. Since the frames coming from end device have virtual RBridge 152's identifier as their ingress RBridge identifier, when RBridges in network fabric switch 110 send frames back to end device 104, these frames have virtual RBridge 152's identifier as their egress RBridge identifier, and these frames can be sent to either RBridge 112 or 118.

In virtual link aggregation 150, RBridges 112 and 118 can forward BUM traffic to each other. If the BUM traffic is originated from end device 104, the RBridge receiving the BUM traffic performs source suppression by precluding the BUM traffic from being forwarded to end device 104 (i.e., by precluding the RBridge from determining an output port associated with end device 104 for the BUM traffic). For example, if RBridge 112 receives a frame belonging to BUM traffic, RBridge 112 checks the source RBridge identifier of the frame. If the source RBridge identifier is associated with virtual RBridge 152, RBridge considers the frame to be from end device 104 and suppress source forwarding by not forwarding the frame to end device 104.

In addition, ingress RBridge 112, 118, or both can receive a frame belonging to BUM traffic via virtual link aggregation 150 (i.e., from end device 104). Upon receiving the frame, ingress RBridge 112 and/or 118 forward the received frame to a root RBridge of a multicast tree in fabric switch 110. In this example, RBridges 116 and 126 can be the root RBridges of fabric switches 110 and 120, respectively. Ingress RBridge 112 and/or 118 set the destination RBridge identifier to be the RBridge identifier of root RBridge 116 and send the frame toward RBridge 116. Root RBridge 116, in turn, distributes the frame to a respective RBridge in fabric switch 110 via the multicast tree.

Similar to end device 104, end device 102 is also multi-homed and coupled to RBridges 112 and 122 of fabric switches 110 and 120, respectively. Hence, RBridges 112 and 122 form a virtual link aggregation 130 across fabric switches 110 and 120. End device 102 view RBridges 112 and 122 as a common virtual RBridge 132, with a corresponding virtual RBridge identifier. Dual-homed end device 102 is considered to be logically coupled to virtual RBridge 132 via logical links represented by dotted lines. Virtual RBridge 132 is considered to be logically coupled to partner RBridges 112 and 122, optionally with zero-cost links (also represented by dotted lines). Details about virtual link aggregation and virtual RBridge assignment can be found in U.S. patent application Ser. No. 12/725,249, the disclosure of which is incorporated herein.

Other RBridges in fabric switches 110 and 120 view end device 102 to be coupled to virtual RBridge 132. Incoming frames from end device 102 is marked with virtual RBridge 152's identifier as their ingress RBridge identifier. When RBridges in network fabric switches 110 and 120 send frames back to end device 102, these frames have virtual RBridge 152's identifier as their egress RBridge identifier. Frames from RBridges in fabric switch 110 are received by RBridge 112 and frames from RBridges in fabric switch 120 are received by RBridge 122.

However, source suppression of virtual link aggregation 150 may not be applicable to virtual link aggregation 130 because virtual link aggregation 130 spans two fabric switches. Typically, a fabric switch has a local identifier range associated with the fabric switch. A respective RBridge, physical or virtual, of that fabric switch is assigned an RBridge identifier from that corresponding local identifier range. As a result, virtual RBridge 152 is assigned an identifier from the local identifier range associated with fabric switch 110. Furthermore, the virtual RBridge identifier assigned by fabric switch 110 does not go beyond the boundaries of fabric switch 110. If virtual RBridge 132 is assigned an identifier from the local identifier range of fabric switch 110, RBridge 122 would not recognize the identifier and would not perform source suppression because virtual RBridge identifier is unknown to RBridge 122. Similarly, if virtual RBridge 132 is assigned an identifier from the local identifier range of fabric switch 120, RBridge 112 would not perform source suppression based on the unknown virtual RBridge identifier.

In addition, forwarding of BUM traffic from virtual link aggregation 150 may not be applicable to virtual link aggregation 130 because root RBridge is typically fabric specific. For example, to forward a frame belonging to BUM traffic, if RBridge 116 is assigned as the root RBridge, the frame is going to be distributed in fabric switch 110. On the other hand, if RBridge 126 is assigned as the root RBridge, the frame is going to be distributed in fabric switch 120. Hence, for virtual link aggregation 130 that spans multiple fabric switches, a fabric-specific root RBridge is not suitable for forwarding BUM traffic.

In embodiments of the present invention, the aforementioned problems are solved by assigning an identifier to virtual RBridge 132 from a global identifier range, which is known, recognizable, and unique in both fabric switches 110 and 120. This allows partner RBridges 112 and 122, which are in different fabric switches, to recognize the virtual RBridge identifier and perform source suppression for BUM traffic originating from end device 102 associated with virtual link aggregation 130. Furthermore, a virtual root RBridge 136 is created, which is associated with root RBridges 116 and 126. Virtual root RBridge 136 is considered to be logically coupled to root RBridges 116 and 126, optionally with zero-cost links (represented by dotted lines). Virtual root RBridge 136 is also assigned an identifier from the global identifier range, which is known, recognizable, and unique in both fabric switches 110 and 120. Upon receiving a frame belonging to BUM traffic, partner RBridges 112 and 122 set the identifier of virtual root RBridge 136 as the egress RBridge identifier of the TRILL encapsulation of the frame.

Because virtual RBridge 136 is considered to be logically coupled to root RBridges 116 and 126, virtual root RBridge 136 is mapped to the respective root RBridge of fabric switches 110 and 120. For example, in fabric switch 110, upon receiving a frame belonging to BUM traffic via virtual link aggregation 130, RBridge 112 encapsulates the frame in a multicast TRILL header and sets the egress RBridge identifier of the TRILL header to be virtual root RBridge 136's identifier. RBridge 112 then forwards this TRILL-encapsulated frame (can be referred to as a TRILL packet) toward virtual root RBridge 136. In this disclosure, the terms "TRILL-encapsulated frame" and "TRILL packet" are used interchangeably. Because virtual root RBridge 136 is logically coupled to root RBridge 116, the TRILL packet then reaches root RBridge 116. Upon receiving the TRILL packet, root RBridge 116 forwards the frame to respective RBridge in fabric switch 110. Similarly, in fabric switch 120, RBridge 122 sends a TRILL-encapsulated frame belonging to BUM traffic toward virtual root RBridge 136. Root RBridge 126 receives the frame and forwards the frame to respective RBridge in fabric switch 120.

For a respective frame from end device 102, the corresponding ingress RBridge (i.e., RBridge 112 if the traffic enters fabric switch 110, or RBridge 122 if the traffic enters fabric switch 120) attaches a TRILL header to the frame and sets the identifier of virtual RBridge 132 as the ingress RBridge identifier in the TRILL header. If the frame belongs to BUM traffic, regardless of whether the frame is sent to RBridge 112 or 122, the corresponding ingress RBridge sets the identifier of virtual RBridge 132 as the ingress RBridge identifier and the identifier of virtual root RBridge 136 as the egress RBridge identifier in the TRILL header.

Because virtual RBridge 132's identifier is known to both fabric switches 110 and 120, partner RBridges 122 and 122 can facilitate source suppression for BUM traffic from end device 102. For example, when RBridge 112 or 122 receives from another RBridge a TRILL packet with a TRILL ingress RBridge identifier set to be virtual RBridge 132's identifier, RBridge 112 or 122 recognizes the packet to be from end device 102 and drops the packet, thereby preventing undesired looping. Furthermore, because virtual root RBridge 136's identifier is known to both fabric switches 110 and 120, when a TRILL-encapsulated frame belonging to BUM traffic reaches an RBridge in either fabric switch, the RBridge forwards the packet toward the physical root RBridge of the fabric switch in which the RBridge is a member.

Figure 1B:
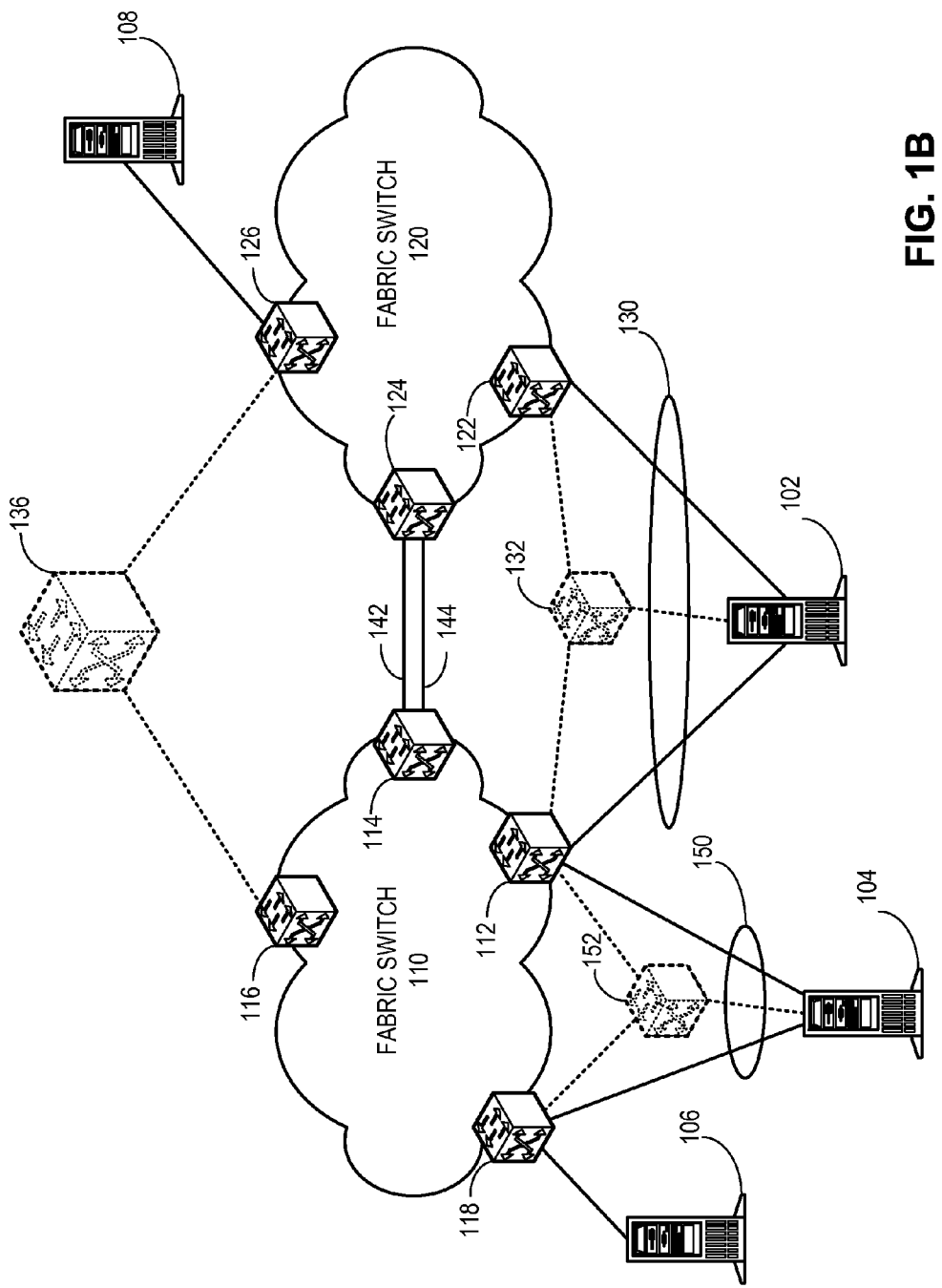
FIG. 1B illustrates an exemplary virtual link aggregation across multiple fabric switches coupled via TRILL forwarding link(s), in accordance with an embodiment of the present invention.

In some embodiments, there are at least two links between fabric switches 110 and 120. FIG. 1B illustrates an exemplary virtual link aggregation across multiple fabric switches coupled via TRILL forwarding link(s), in accordance with an embodiment of the present invention. In this example, RBridge 114 of fabric switch 110 and RBridge 124 of fabric switch 120 have two links 142 and 144 between them. Link 142 is referred to as a TRILL primary link. Link 142 is used for forwarding TRILL-encapsulated frame belonging to BUM traffic while retaining the TRILL encapsulation. Typically, TRILL encapsulation is specific to a fabric switch, and when a frame leaves a fabric switch, the TRILL encapsulation is removed. However, a TRILL-encapsulated frame belonging to BUM traffic forwarded via TRILL primary link 142 (i.e., via a TRILL-supported edge port of RBridge 114 coupled to link 142) retains the TRILL encapsulation. This allows the TRILL header to retain virtual RBridge 132's identifier as the ingress RBridge identifier and virtual root RBridge 136's identifier as the egress RBridge identifier.

During operation, end device 102 generates a frame belonging to BUM traffic and sends the frame to RBridge 112. Upon receiving the frame, RBridge 112 encapsulates the frame with a TRILL header with virtual RBridge 132's identifier as the ingress RBridge identifier and virtual root RBridge 136's identifier as the egress RBridge identifier. Subsequently, RBridge 112 forwards the TRILL packet toward virtual root RBridge 136. Because root RBridge 116 is logically coupled to virtual root RBridge 136, root RBridge 116 receives the TRILL packet and distributes this TRILL packet along its multicast tree to respective RBridge of fabric switch 110.

When this TRILL packet reaches RBridge 114, RBridge 114 forwards this TRILL packet via link 124 with the same ingress and egress RBridge identifiers. When RBridge 124 receives this TRILL packet, RBridge 124, in turn, forwards the packet toward virtual root RBridge 136. Because root RBridge 126 of fabric switch 120 is logically coupled to virtual root RBridge 136, root RBridge 126 receives the TRILL packet and distributes this TRILL packet along its multicast tree to respective RBridge of fabric switch 120. When this packet reaches RBridge 122, RBridge 122 prevents the packet from being forwarded to end device 102 because the packet's ingress RBridge identifier is virtual RBridge 132's identifier.

If end device 102 generates an Ethernet frame destined for an end device 108, which is coupled to fabric switch 120 via RBridge 126, and sends this frame to RBridge 112, RBridge 112 generates a TRILL header with an egress RBridge identifier set to be RBridge 114's identifier. Consequently, when the TRILL packet reaches RBridge 114, RBridge 114 decapsulates the packet's TRILL header and forwards the Ethernet frame via link 144. This link 144 can be referred to as an Ethernet primary link. When the Ethernet frame reaches RBridge 124 via Ethernet primary link 144, RBridge 124 generates a new TRILL header with RBridge 126's identifier as the egress RBridge identifier of the new TRILL header.

In some embodiments, RBridge 114 determines whether to forward via Ethernet primary link 144 based on the identifier range of the ingress RBridge identifier of a TRILL packet. For example, if the TRILL packet includes an Ethernet frame from end device 106, the ingress RBridge identifier of the TRILL packet is RBridge 118's identifier. Similarly, if the TRILL packet includes an Ethernet frame from end device 104, the ingress RBridge identifier of the TRILL packet is virtual RBridge 152's identifier. Because RBridge 118's identifier and virtual RBridge 152's identifier are from the local identifier range associated with fabric switch 110, RBridge 114 removes the TRILL encapsulation of the TRILL packet and forwards the Ethernet frame via link 144. However, if the identifier range of the ingress RBridge identifier of a TRILL packet corresponds to a global identifier range, RBridge 114 checks whether the packet belongs to BUM traffic, and forwards accordingly.

Frame Forwarding

Figure 2A:
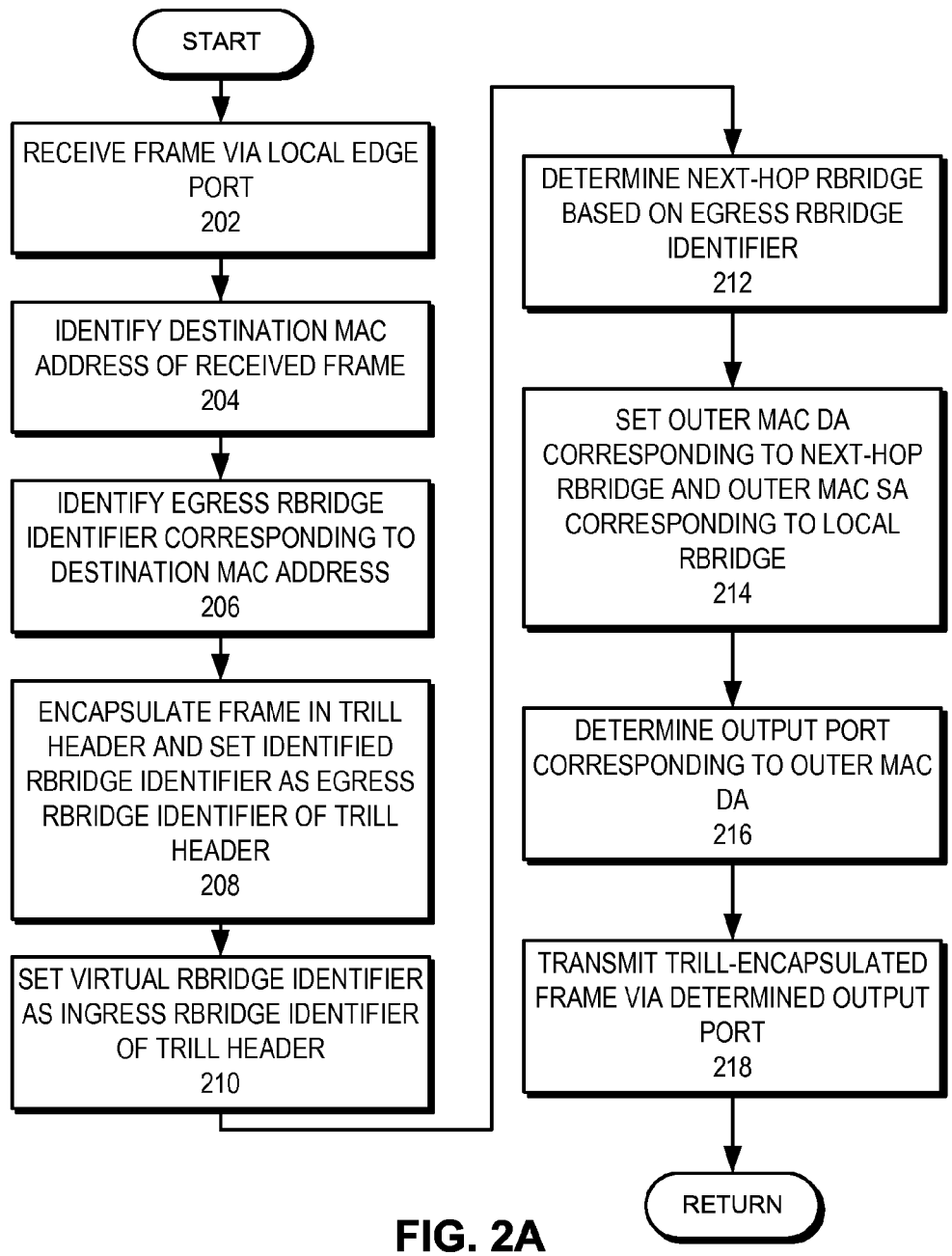
FIG. 2A presents a flowchart illustrating the process of forwarding a frame received via an edge port at a partner routing Bridge (RBridge) which participates in a virtual link aggregation across multiple fabric switches, in accordance with an embodiment of the present invention.

In the example in FIG. 1B, partner RBridges 112 and 122 are responsible for forwarding frames received via local edge ports from end device 102. On the other hand, a respective RBridge in fabric switches 110 and 120 can forward a TRILL-encapsulated frame destined for end device 102. FIG. 2A presents a flowchart illustrating the process of forwarding a frame received via an edge port at a partner RBridge which participates in a virtual link aggregation across multiple fabric switches, in accordance with an embodiment of the present invention. Upon receiving a frame via a local edge port (operation 202), the partner RBridge identifies the destination media access control (MAC) address of the received frame (operation 204). The partner RBridge then identifies the egress RBridge identifier corresponding to the destination MAC address (operation 206). For example, if the destination MAC address corresponds to an end device coupled to another fabric switch, the egress RBridge identifier is the identifier of an RBridge coupled to the other fabric switch, as described in conjunction with FIG. 1B.

The partner RBridge encapsulates the frame in a TRILL header and sets the identified RBridge identifier as the egress RBridge identifier (operation 208) and sets a virtual RBridge identifier associated with the virtual link aggregation as the ingress RBridge identifier of the TRILL header (operation 210). The partner RBridge determines the next-hop RBridge based the egress RBridge identifier (operation 212), and sets the outer destination MAC address (MAC DA) corresponding to the next-hop RBridge and outer source MAC address (MAC SA) corresponding to the local RBridge (operation 214). The partner RBridge then determines the output port corresponding to the outer destination MAC address (operation 216) and transmits the TRILL-encapsulated frame via the determined output port (operation 218).

Figure 2B:
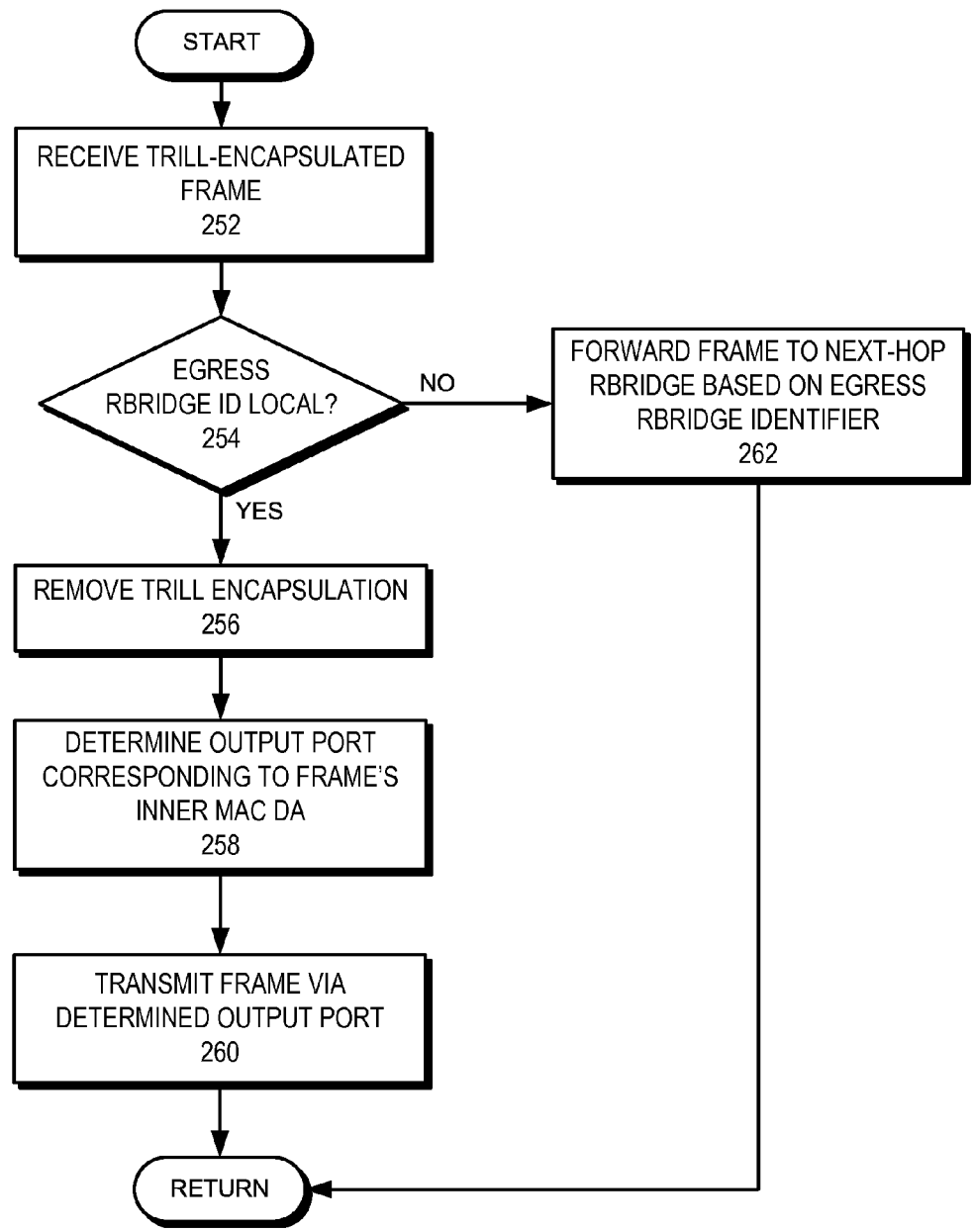
FIG. 2B presents a flowchart illustrating the process of an RBridge forwarding a TRILL-encapsulated unicast frame, in accordance with an embodiment of the present invention.

FIG. 2B presents a flowchart illustrating the process of an RBridge forwarding a TRILL-encapsulated unicast frame, in accordance with an embodiment of the present invention. Upon receiving a TRILL-encapsulated frame (operation 252), the RBridge checks whether the egress RBridge identifier is local (i.e., whether the egress RBridge identifier is associated with the local RBridge) (operation 254). In the example of FIG. 1A, virtual RBridge 132's identifier and RBridge 112's identifier both are associated with RBridge 112. Hence, if the egress RBridge identifier of the TRILL header corresponds to a virtual or physical RBridge identifier associated with the local RBridge, the RBridge determines that the egress RBridge identifier is local.

If the egress RBridge identifier is not local, the RBridge forwards the frame to the next-hop RBridge based on the egress RBridge identifier (operation 262). If the egress RBridge identifier is local, the RBridge removes the TRILL encapsulation (operation 256), determines the output port corresponding to the frame's inner destination MAC address (operation 258), and transmits the frame via the determined output port (operation 260).

Figure 3A:
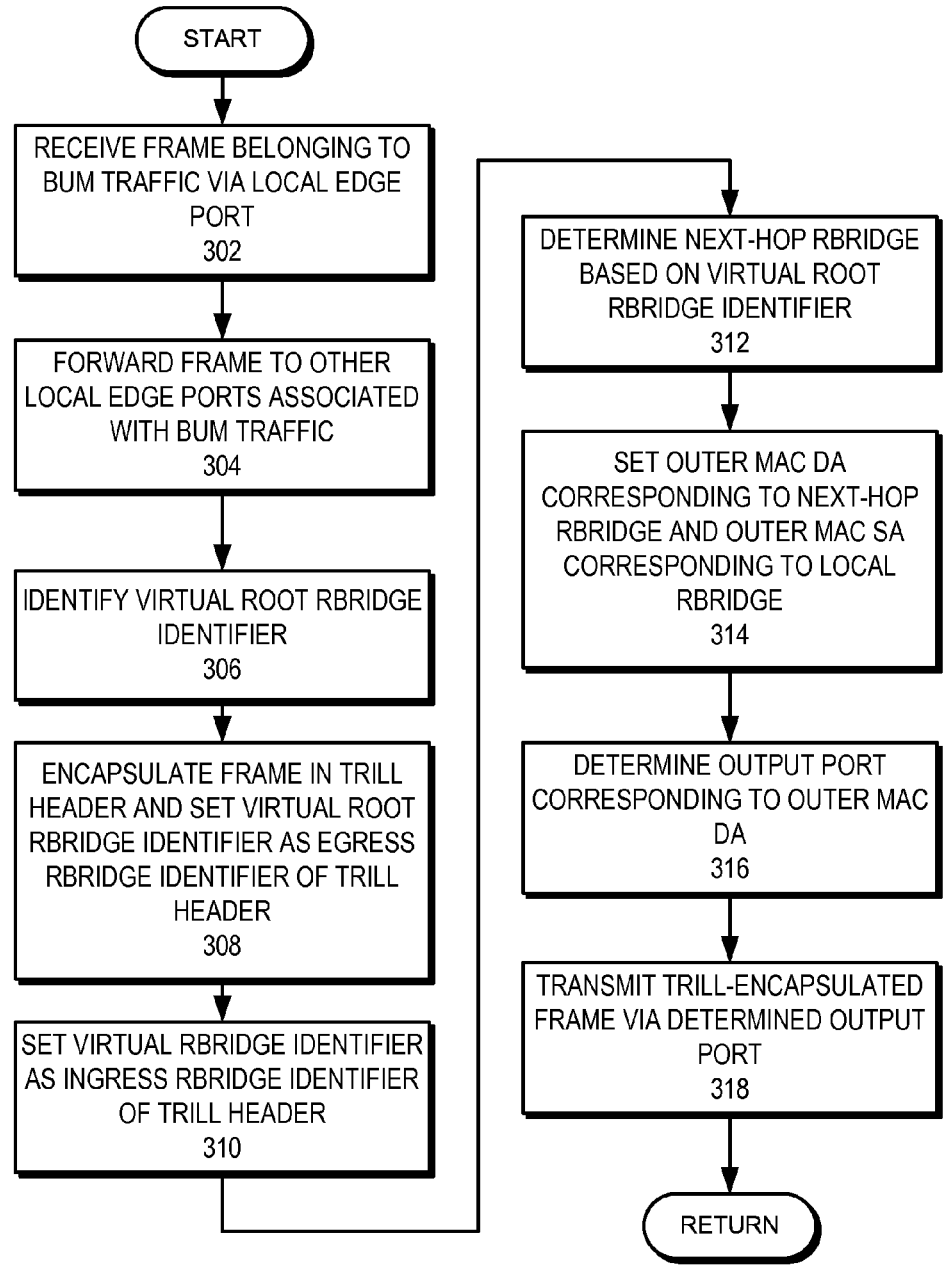
FIG. 3A presents a flowchart illustrating the process of forwarding a frame belonging to broadcast, unknown unicast, and multicast (BUM) traffic received via an edge port at a partner RBridge which participates in a virtual link aggregation across multiple fabric switches, in accordance with an embodiment of the present invention.

In the example in FIG. 1B, partner RBridges 112 and 122 are responsible for forwarding frames belonging to BUM traffic received via local edge ports from end device 102. On the other hand, a respective RBridge in fabric switches 110 and 120 can forward a TRILL-encapsulated frame belonging to BUM traffic. FIG. 3A presents a flowchart illustrating the process of forwarding a frame belonging to BUM traffic received via an edge port at a partner RBridge which participates in a virtual link aggregation across multiple fabric switches, in accordance with an embodiment of the present invention. Upon receiving a frame belonging to BUM traffic via a local edge port (operation 302), the partner RBridge forwards the frame to other local edge ports associated with the BUM traffic (operation 304). For example, if the frame is a multicast frame of a multicast group, the partner RBridge forwards the frame to the local end devices, which are members of the multicast group.

The partner RBridge then identifies the virtual root RBridge identifier (operation 306), and encapsulates the frame in a TRILL header and sets the virtual root RBridge identifier as the egress RBridge identifier of the TRILL header (operation 308). The partner RBridge sets a virtual RBridge identifier associated with the virtual link aggregation as the ingress RBridge identifier of the TRILL header (operation 310). The partner RBridge determines the next-hop RBridge based the virtual root RBridge identifier (operation 312), and sets the outer destination MAC address corresponding to the next-hop RBridge and outer source MAC address corresponding to the local RBridge (operation 314). The partner RBridge then determines the output port corresponding to the outer destination MAC address (operation 316) and transmits the TRILL-encapsulated frame via the determined output port (operation 318).

Figure 3B:
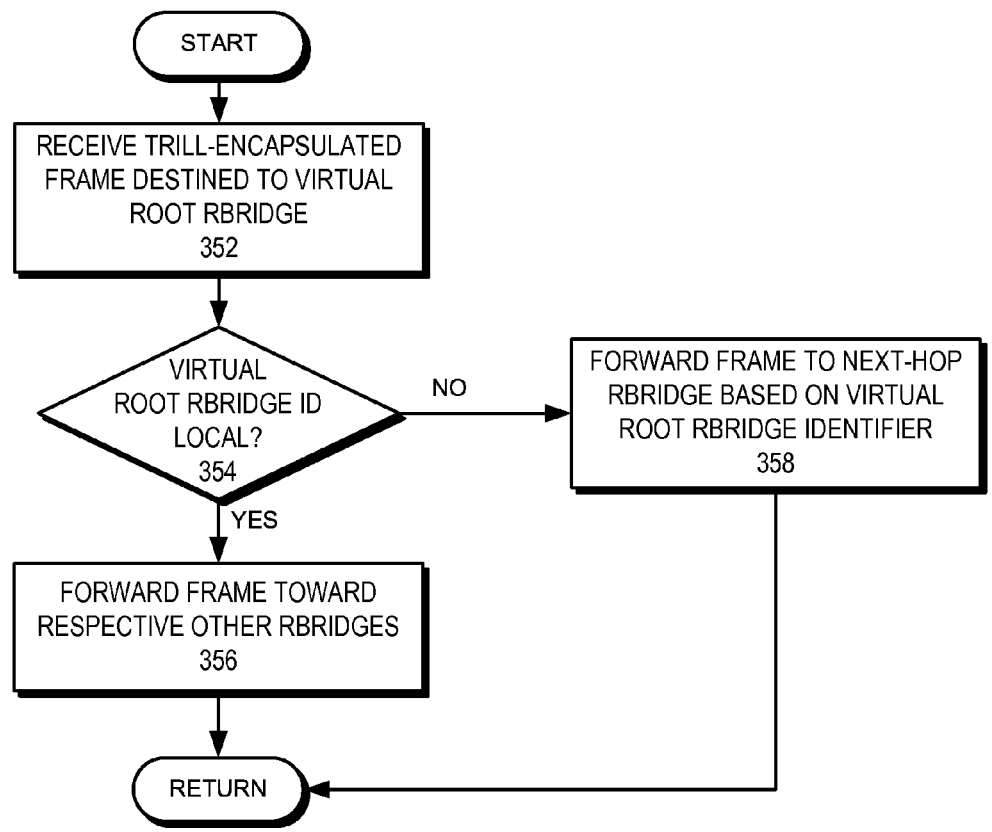
FIG. 3B presents a flowchart illustrating the process of an RBridge forwarding a TRILL-encapsulated frame destined to a virtual root RBridge, in accordance with an embodiment of the present invention.

FIG. 3B presents a flowchart illustrating the process of an RBridge forwarding a TRILL-encapsulated frame destined to a virtual root RBridge, in accordance with an embodiment of the present invention. Note that a frame destined to virtual root RBridge belongs to BUM traffic and the egress RBridge identifier of the TRILL header of the frame is the identifier of the virtual root RBridge. Upon receiving a TRILL-encapsulated frame destined to virtual root RBridge (operation 352), the RBridge checks whether the virtual root RBridge identifier is local (i.e., the virtual root RBridge identifier is associated with the local RBridge) (operation 354). In the example of FIG. 1A, virtual root RBridge 136's identifier is local to both RBridges 116 and 118.

If the virtual root RBridge identifier is not local, the RBridge forwards the frame to the next-hop RBridge based on the virtual root RBridge identifier (operation 358). Otherwise, the RBridge is the root RBridge of the corresponding fabric switch. Hence, the RBridge forwards the frame to respective other RBridges of the fabric switch (operation 356).

Figure 3C:
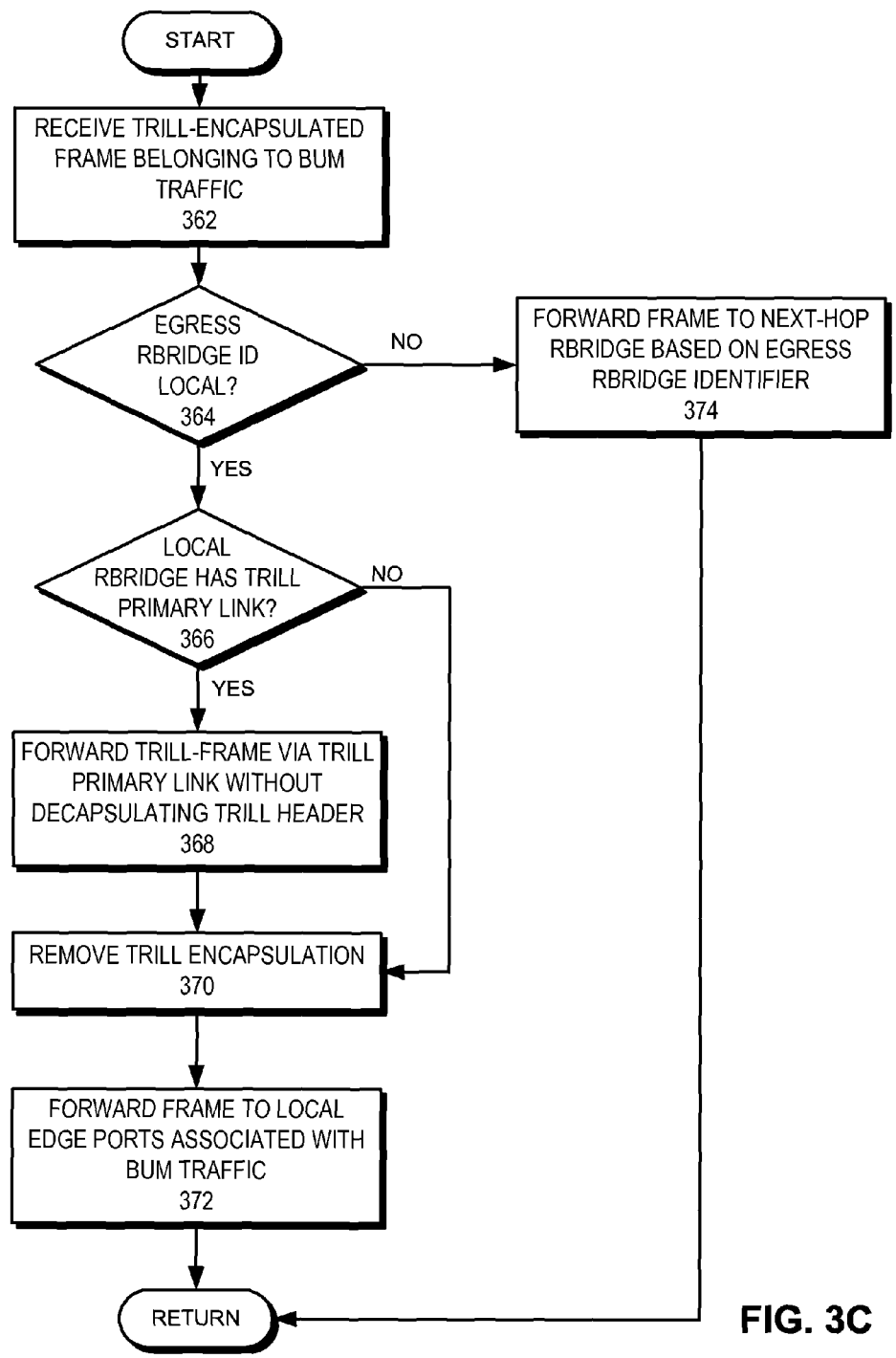
FIG. 3C presents a flowchart illustrating the process of an RBridge forwarding a TRILL-encapsulated frame belonging to BUM traffic, in accordance with an embodiment of the present invention.

FIG. 3C presents a flowchart illustrating the process of an RBridge forwarding a TRILL-encapsulated frame belonging to BUM traffic, in accordance with an embodiment of the present invention. Upon receiving a TRILL-encapsulated frame belonging to BUM traffic from virtual root RBridge (operation 362), the RBridge checks whether the egress RBridge identifier is local (i.e., the egress RBridge identifier is associated with the local RBridge) (operation 364). If the egress RBridge identifier is not local, the RBridge forwards the frame to the next-hop RBridge based on the egress RBridge identifier (operation 374).

If the egress RBridge identifier is local, the RBridge checks whether the local RBridge has a TRILL primary link (operation 366). In the example of FIG. 1B, RBridges 114 and 124 have a TRILL primary link. If the RBridge has a TRILL primary link, the RBridge forwards the TRILL-encapsulated frame via the TRILL primary link without decapsulating the TRILL header (operation 368), as described in conjunction with FIG. 1B. If the RBridge does not have a TRILL primary link (operation 366) or has forwarded the TRILL-encapsulated frame via the TRILL primary link (operation 368), the RBridge removes the TRILL encapsulation (operation 370) and forwards the frame to local edge ports associated with BUM traffic (operation 372). For example, if the frame is a multicast frame of a multicast group, the RBridge forwards the frame to the local end devices, which are members of the multicast group.

Failure Handling

Figure 4A:
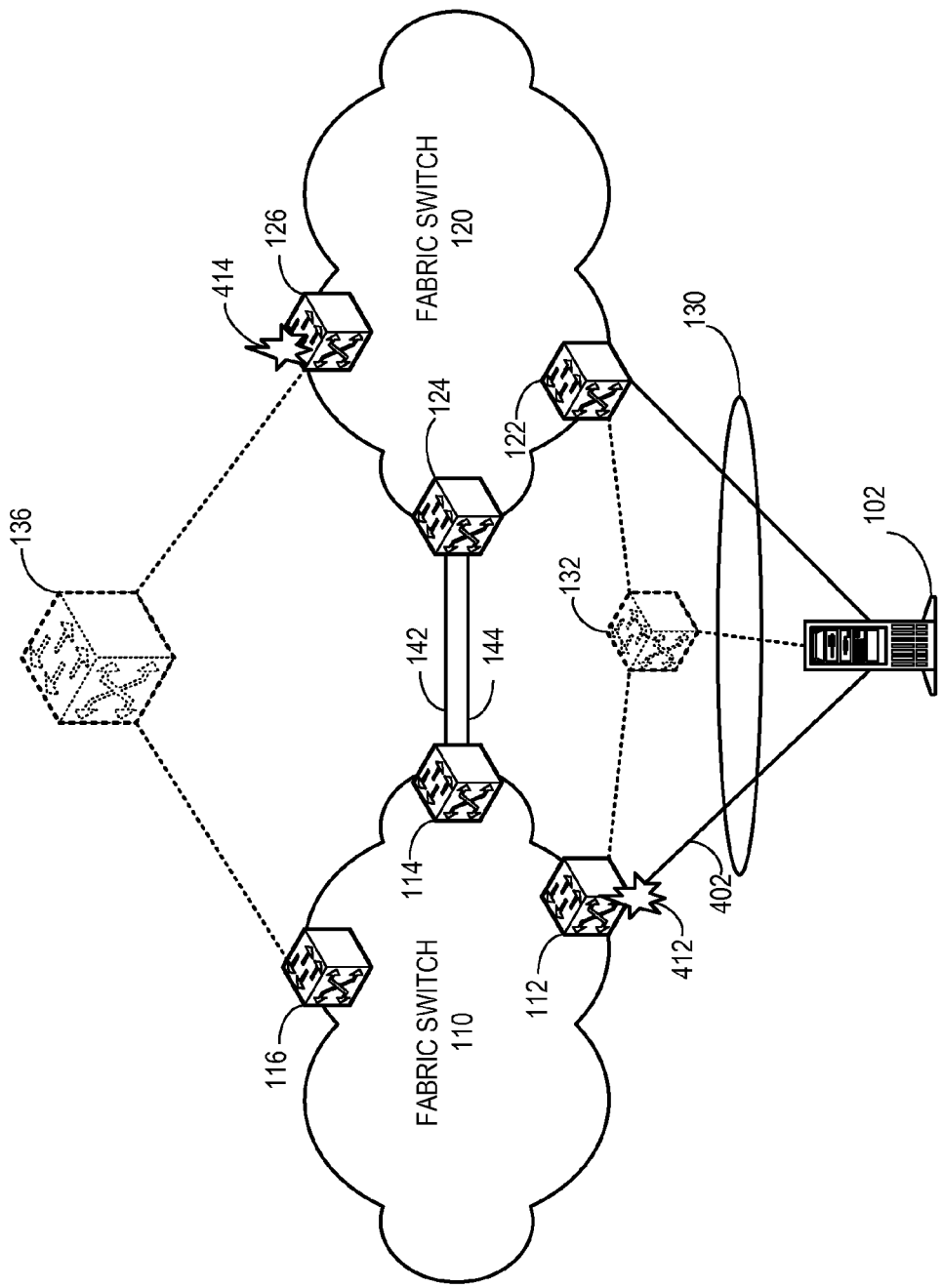
FIG. 4A illustrates exemplary failure scenarios associated with a virtual link aggregation across multiple fabric switches, in accordance with an embodiment of the present invention.

FIG. 4A illustrates exemplary failure scenarios associated with a virtual link aggregation across multiple fabric switches, in accordance with an embodiment of the present invention. Suppose that failure 412 disrupts the availability of RBridge 122 to end device 102 (e.g., reachability between RBridge 122 and end device 102). Examples of failure 412 include, but are not limited to, a failure of link 402 between RBridge 112 and end device 102, an interface card failure in RBridge 112 and/or end device 102 associated with link 402, node failure of RBridge 112, unavailability of fabric switch 110. Examples of a cause for unavailability of fabric switch 110 include, but are not limited to, software update, maintenance, and wiring updates to inter-switch links. Consequently, RBridge 112 can no longer couple end device 102 via virtual link aggregation 130.

As a result, RBridge 122 starts receiving frames from end device 102. Upon detecting failure 412, instead of virtual RBridge 132's identifier, RBridge 122 starts setting RBridge 122's identifier as the ingress RBridge identifier in the TRILL encapsulations of the frames from end device 102. In other words, since end device 102 no longer has virtual link aggregation 130 to both RBridges 112 and 122, virtual RBridge 132 no longer exists for end device 102. After the TRILL-encapsulated frames from end device 102 reach other egress RBridges in fabric switch 120, these RBridges learn that the MAC address corresponding to end device 102 is associated with RBridge 122, instead of virtual RBridge 132. Subsequent frames destined to end device 102 are sent to RBridge 122.

Note that, during the topology convergence process, other RBridges can continue to send frames to virtual RBridge 132. If RBridge 112 is available (e.g., has not suffered a node failure), RBridge 112 may continue to receive frames destined to end device 102. RBridge 112 can flood these frames to all the ports (except the ports from which the frames are received), or optionally forward these frames to RBridge 122 so there is minimal data loss.

Suppose that failure 414 disrupts the availability of root RBridge 126. Examples of failure 414 include, but are not limited to, one or more link failures disconnecting RBridge 126 from fabric switch 120, one or more interface card failures in RBridge 126 disconnecting RBridge 126 from fabric switch 120, node failure of RBridge 126, unavailability of fabric switch 120. Examples of a cause for unavailability of fabric switch 120 include, but are not limited to, software update, maintenance, and wiring updates to inter-switch links. Consequently, RBridge 126 can no longer serve as the root RBridge for fabric switch 120. In some embodiments, upon detecting the unavailability of RBridge 126, the active RBridges of fabric switch 120 elect another root RBridge among the active RBridges and associate virtual root RBridge 136 with the newly elected root RBridge of fabric switch 120. This newly elected root RBridge can be logically coupled to virtual root RBridge 136, optionally with zero-cost links.

Figure 4B:
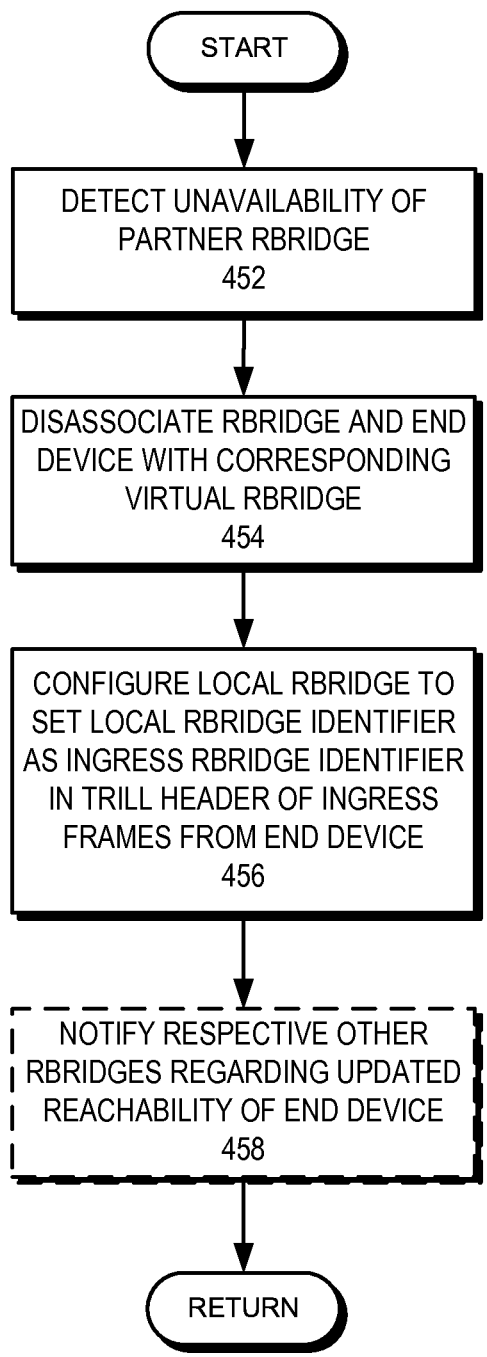
FIG. 4B presents a flowchart illustrating the process of handling a failure that affects a partner RBridge which participates in a virtual link aggregation across multiple fabric switches, in accordance with an embodiment of the present invention.

FIG. 4B presents a flowchart illustrating the process of handling a failure that affects a partner RBridge which participates in a virtual link aggregation across multiple fabric switches, in accordance with an embodiment of the present invention. During operation, an RBridge detects unavailability of its partner RBridge (operation 452). The RBridge then disassociates the RBridge and the end device with the corresponding virtual RBridge (operation 454), and returns to the normal forwarding and/or flooding operation as for non-trunked ports. Furthermore, the RBridge configures local RBridge to set its own RBridge identifier as the ingress RBridge identifier in the TRILL header of the ingress frames from the end device (operation 456). Optionally, the RBridge can broadcast the MAC reachability of the end device via its own RBridge identifier to other RBridges in the corresponding fabric switch (operation 458).

Figure 4C:
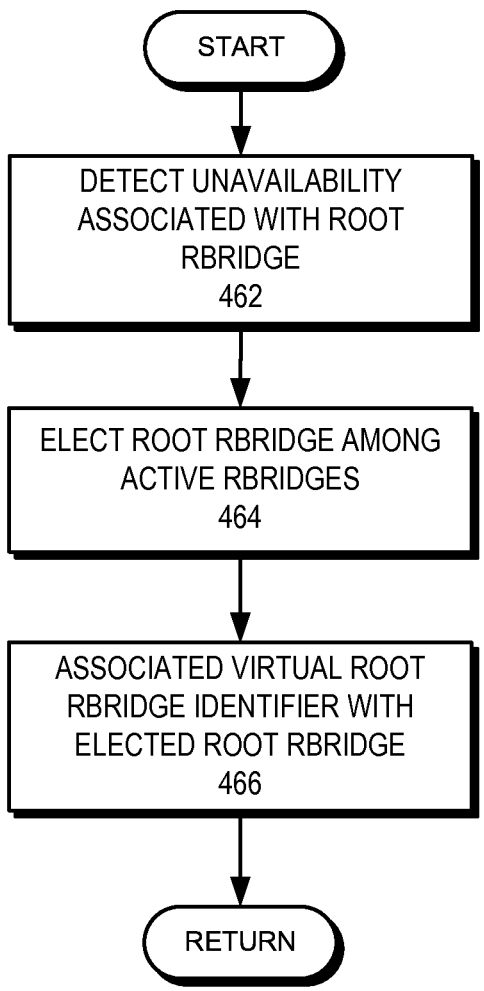
FIG. 4C presents a flowchart illustrating the process of handling a failure that affects a root RBridge which is associated with a virtual root RBridge, in accordance with an embodiment of the present invention.

FIG. 4C presents a flowchart illustrating the process of handling a failure that affects a root RBridge which is associated with a virtual root RBridge, in accordance with an embodiment of the present invention. Upon detecting the unavailability of a root RBridge (operation 462), the active RBridges of the corresponding fabric switch elect another root RBridge among the active RBridges (operation 464) and associate the virtual root RBridge with the newly elected root RBridge (operation 466). This newly elected root RBridge can be logically coupled to the virtual root RBridge, optionally with zero-cost links.

Hybrid Virtual Link Aggregation

Figure 5A:
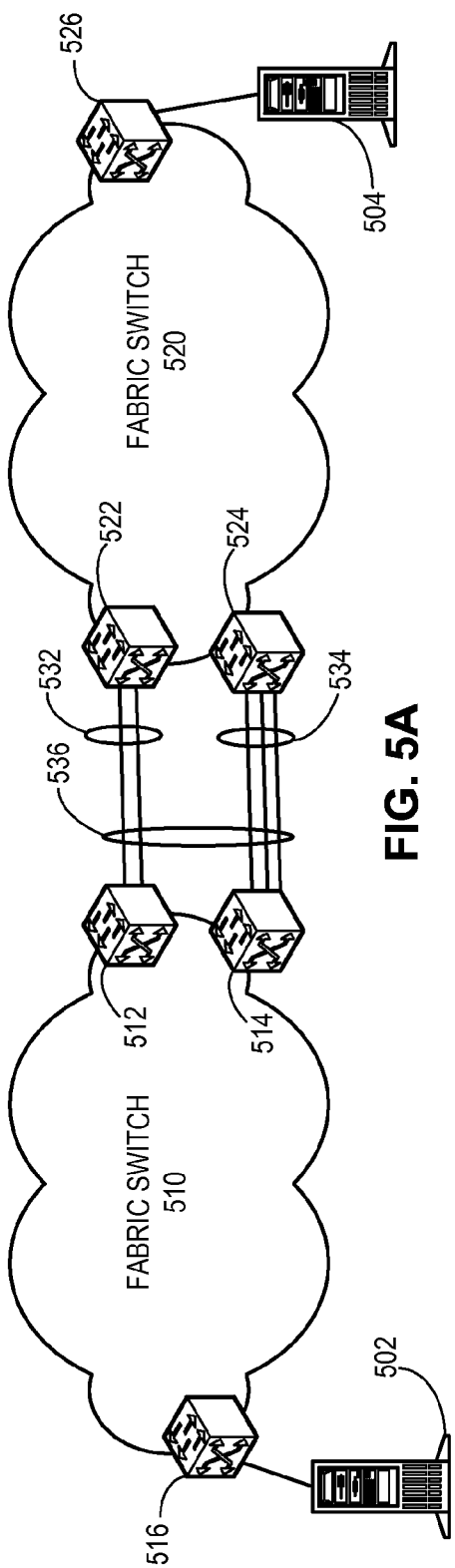
FIG. 5A illustrates an exemplary hybrid virtual link aggregation across multiple fabric switches, in accordance with an embodiment of the present invention.

FIG. 5A illustrates an exemplary hybrid virtual link aggregation across multiple fabric switches, in accordance with an embodiment of the present invention. As illustrated in FIG. 5A, a fabric switch 510 includes member switches 512, 514 and 516, and a fabric switch 520 includes member switches 522, 524, and 526. One or more switches in fabric switches 510 and 520 can be virtual switches (e.g., a software switch running on a computing device). In some embodiments, fabric switches 510 and 520 are TRILL networks and a respective member switch of fabric switches 510 and 520, such as switch 512 and 522, are TRILL RBridges. End devices 502 and 504 are coupled to RBridges 516 and 526, respectively. RBridges in fabric switches 510 and 520 use edge ports to communicate to end devices and inter-switch ports to communicate to other member switches. Communication via an edge port can be based on Ethernet and via an inter-switch port can be based on TRILL protocol.

RBridges 512 and 522 are coupled to each other via a plurality of links. These links can be configured to operate as a trunk 532. Similarly, RBridges 514 and 524 are coupled to each other via a plurality of links. These links can be configured to operate as a trunk 534. In some embodiments, trunks 532 and 534 can be configured to operate in a special "trunked" mode and form a hybrid virtual link aggregation 536. Even though RBridge 512 is not coupled to RBridge 524, and RBridge 514 is not coupled to RBridge 522, trunks 532 and 534 can operate as one hybrid virtual link aggregation.

RBridges 516 considers hybrid virtual link aggregation 536 as one single link associated with two RBridges 512 and 514. Similarly, RBridges 526 considers hybrid virtual link aggregation 536 as one single link associated with two RBridges 522 and 524. As a result, to forward a frame toward RBridge 526, RBridge 516 first determines an egress RBridge between RBridges 512 and 514. Suppose that RBridge 516 determines RBridge 512 as the egress RBridge, encapsulates the frame in a TRILL header, and sends the TRILL-encapsulated frame to RBridge 512. Upon receiving the frame, RBridge 512 removes the TRILL header, selects a physical link in trunk 532, and forwards the frame via the selected link.

Figure 5B:
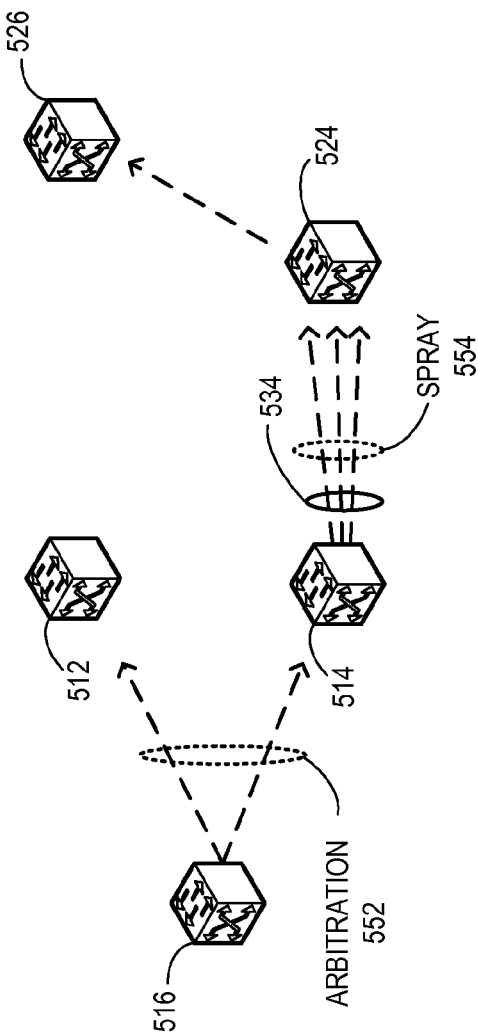
FIG. 5B illustrates an exemplary packet forwarding via a hybrid virtual link aggregation across multiple fabric switches, in accordance with an embodiment of the present invention.

FIG. 5B illustrates an exemplary packet forwarding via a hybrid virtual link aggregation across multiple fabric switches, in accordance with an embodiment of the present invention. During operation, end device 502 is in communication with end device 504 and forwarding a plurality of frames toward end device 504. Upon receiving a frame from end device 502, ingress RBridge 516 first determines that end device 504 is coupled to fabric switch 510 via hybrid virtual link aggregation 536, which is associated with RBridges 512 and 514. In some embodiments, a respective RBridge in fabric switch 510 maintains a mapping between hybrid virtual link aggregation 536, and associated RBridges 512 and 514.

RBridge 516 then uses an arbitration mechanism 552 to determine an egress RBridge from RBridges 512 and 514 for a respective frame. In some embodiments, arbitration mechanism 552 can be a hash function. This hash function can select the egress RBridge such a way that frames from 516 are distributed among RBridges 512 and 514 based on a policy. Examples of a policy include, but are not limited to, load balancing, quality of service, security, network availability, and computing resources. Suppose that arbitration mechanism 552 selects RBridge 514 as the egress RBridge. RBridge 516 then encapsulates the frame in a TRILL header and forwards the frame toward RBridge 514 based the TRILL encapsulation. RBridge 514 receives the frame and removes the TRILL encapsulation. RBridge 514 then determines the physical link in trunk 534 via which the frame should be forwarded.

In some embodiments, RBridge 514 can forward frames across the multiple links in trunk 534, thereby achieving a desired distribution among the links in trunk 534. Such transmission allows RBridge 514 to perform spray operation 554 on frames by selecting respective output ports for the frames such a way that the frames are distributed to different links of trunk 534. Upon receiving a frame, RBridge 524 identifies that end device 504 is coupled to RBridge 526, encapsulates the frame in a TRILL header, sets RBridge 526's identifier as the egress RBridge identifier in the TRILL header, and forwards the TRILL packet toward egress RBridge 526.

Exemplary RBridge

Figure 6:
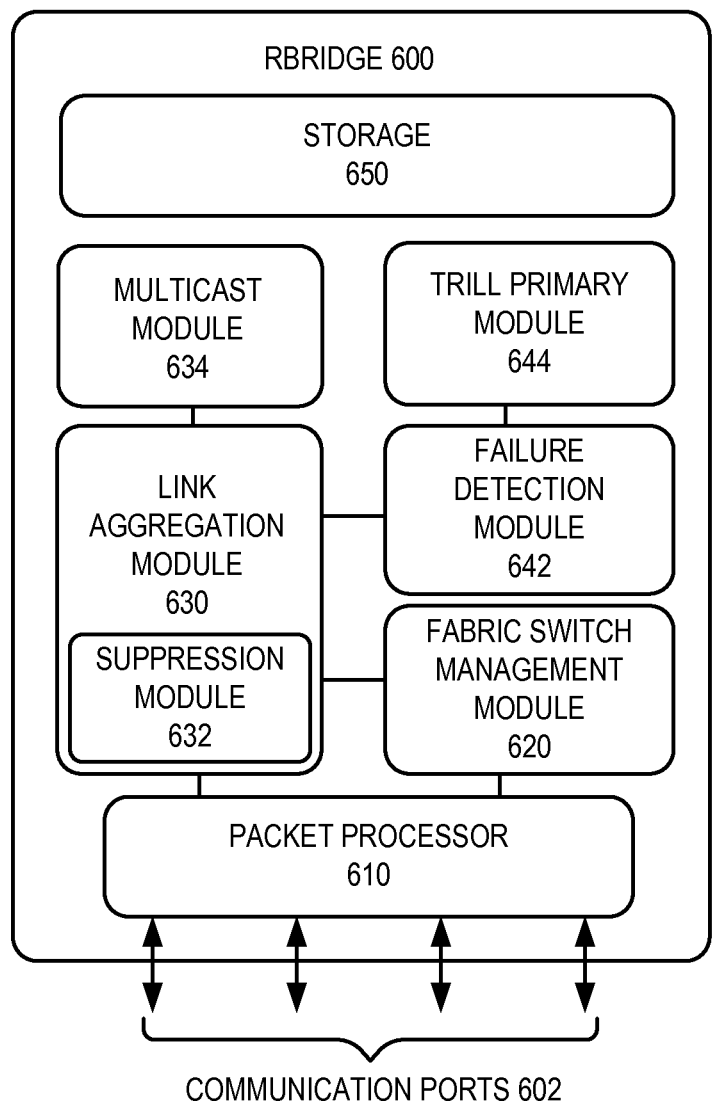
FIG. 6 illustrates an exemplary RBridge which supports virtual link aggregation across multiple fabric switches, in accordance with an embodiment of the present invention.

FIG. 6 illustrates an exemplary RBridge which supports virtual link aggregation across multiple fabric switches, in accordance with an embodiment of the present invention. In this example, an RBridge 600 includes a number of communication ports 602, a packet processor 610, a link aggregation module 630, a suppression module 632, a multicast module 634, and a storage 650. In some embodiments, packet processor 610 adds a TRILL header to a packet. RBridge 600 can also include a fabric switch management module 620, which maintains a membership in a fabric switch. Switch 600 maintains a configuration database in storage 650 that maintains the configuration state of a respective switch within the fabric switch. Switch 600 maintains the state of the fabric switch, which is used to join other switches. Under such a scenario, communication ports 602 can include inter-switch communication channels for communication within a fabric switch. This inter-switch communication channel can be implemented via a regular communication port and based on any open or proprietary format (e.g., TRILL protocol).

During operation, link aggregation module 630 marks an ingress RBridge identifier field of a frame received via one of the communication ports 602 with a virtual RBridge identifier. Upon receiving a frame, packet processor 610 identifies the virtual RBridge identifier as the egress RBridge identifier of a frame and, in response, determines that RBridge 600 is the egress RBridge for the frame. If the frame belongs to BUM traffic, suppression module 632 precludes RBridge 600 from determining an output port associated with a local end device for the frame, as described in conjunction with FIG. 1A. If RBridge 600 receives a frame belonging to BUM traffic via an edge port, multicast module 634 identifies the frame and marks an egress-switch field of the frame with a virtual root RBridge identifier.

In some embodiments, RBridge 600 also includes a failure detection module 642. Failure detection module 642 can detect unavailability of the physical root RBridge of the fabric switch and, in response, identifies a new multicast root RBridge and associates the virtual root RBridge identifier with the new multicast root RBridge, as described in conjunction with FIG. 4C. Failure detection module 642 can also detect unavailability of a partner RBridge and, in response, disassociates the RBridge from the virtual switch identifier. For any frame received after detecting unavailability of the partner RBridge, failure detection module 642 marks an egress RBridge field of the frame with an RBridge identifier of RBridge 600, as described in conjunction with FIG. 4A.

In some embodiments, RBridge 600 also includes a TRILL-supported edge port in communication ports 602 and a TRILL primary module 644. The TRILL-supported edge port is determined as an output port for frames destined outside of the fabric switch. During operation, TRILL primary module 644 determines a TRILL-encapsulated frame to be belonging to BUM traffic. In response, TRILL primary module 644 precludes RBridge 600 from removing TRILL encapsulation from the TRILL-encapsulated frame and determines the TRILL-supported edge port as the output port for the TRILL-encapsulated frame, as described in conjunction with FIG. 3C.

In some embodiments, link aggregation module 630 operates a trunked link, which is coupled to RBridge 600 via a number of ports in communication ports 602, in conjunction with a second trunked link of a second RBridge of the fabric switch as a virtual link aggregation. The virtual link aggregation is mapped to RBridge 600 and the second RBridge. A second fabric switch is reachable from the fabric switch via the trunked links coupled to RBridge 600 and the second trunked links. In some embodiments, this virtual link aggregation is mapped to RBridge 600 based on a hash function. RBridge 600 can select respective output ports for the frames destined to the second fabric switch such that the frames are distributed across links of the trunked link, thereby spraying the frames across the links of the trunked link, as described in conjunction with FIG. 5B.

Note that the above-mentioned modules can be implemented in hardware as well as in software. In one embodiment, these modules can be embodied in computer-executable instructions stored in a memory which is coupled to one or more processors in RBridge 600. When executed, these instructions cause the processor(s) to perform the aforementioned functions.

In summary, embodiments of the present invention provide a switch and a method for providing virtual link aggregation across multiple fabric switches. In one embodiment, the switch is configurable to be a member of a first fabric switch. The switch includes a link aggregation module. During operation, the link aggregation module marks an ingress-switch field of a frame with a virtual switch identifier. This virtual switch identifier is associated with the switch and a second switch, which is a member of a second fabric switch, and is from a range of identifier associated with the first fabric switch and the second fabric switch. Each of the first fabric switch and the second fabric switch is operable to accommodate a plurality of switches and operate as a single switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch configured to be a member of a first network of interconnected switches, the switch comprising:
   a link aggregation module configured to assign a virtual switch identifier to an ingress-switch field of a first frame, wherein the virtual switch identifier is associated with the switch and a second switch, and wherein the second switch is a member of a second network of interconnected switches;
   wherein the virtual switch identifier is selected from a range of identifiers allocated for both the first and second networks of interconnected switches;
and
   wherein each of the first and second networks of interconnected switches is configured to be controlled as a single logical switch.

2. The switch of claim 1, further comprising a packet processing module configured to:
   identify the virtual switch identifier as egress switch identifier of a second frame; and
   determine the switch as an egress switch for the second frame in response to identifying the virtual switch identifier as the egress switch identifier of the second frame.

3. The switch of claim 1, further comprising a suppression module configured to:
   identify the virtual switch identifier as an egress switch identifier of a second frame, wherein the second frame is a broadcast, unknown unicast, or multicast frame; and
   preclude the switch from determining a local port as output port for the second frame in response to identifying the virtual switch identifier as the egress switch identifier of the second frame.

4. The switch of claim 1, further comprising a multicast module configured to:
   identify a second frame to be a broadcast, unknown unicast, or multicast frame associated with a local end device; and
   assign a virtual root switch identifier as an egress-switch field of the second frame, wherein the virtual root switch identifier is associated with a multicast root switch of the first network of interconnected switches and a multicast root switch of the second network of interconnected switches.

5. The switch of claim 4, further comprising a failure detection module configured to:
   identify a new multicast root switch in response to detecting unavailability of the multicast root switch of the first network of interconnected switches; and
   associate the virtual root switch identifier with the new multicast root switch of the first network of interconnected switches.

6. The switch of claim 1, wherein the switch configured in accordance with one of:
   a Transparent Interconnection of Lots of Links (TRILL) protocol; and
   an Internet Protocol (IP).

7. The switch of claim 1, further comprising:
   a first edge port, wherein the first edge port is configured as an output port for frames destined outside of the first network of interconnected switches;
   a primary module configured to:
      preclude the switch from removing an encapsulation header of an encapsulated frame in response to determining the encapsulated frame to be a broadcast, unknown unicast, or multicast frame; and
      determine the first edge port as the output port for the encapsulated frame.

8. The switch of claim 1, further comprising a failure detection module configured to:
   disassociate the switch from the virtual switch identifier upon detecting unavailability of the second switch; and
   assign a switch identifier of the local switch as an egress-switch field of a second frame, wherein the second frame is received after detecting the unavailability of the second switch.

9. The switch of claim 1, further comprising a control module configured to:
   run a control plane associated with the first network of interconnected switches; and
   control the network of interconnected switches via the control plane.

10. A method, comprising:
    assign a virtual switch identifier to an ingress-switch field of a first frame, wherein the virtual switch identifier is associated with a first switch of a first network of interconnected switches and a second switch of a second network of interconnected switches;
    wherein the virtual switch identifier is selected from a range of identifiers allocated for both the first and second networks of interconnected switches;
and
    wherein each of the first and second networks of interconnected switches is configured to be controlled as a single logical switch.

11. The method of claim 10, further comprising:
    identifying the virtual switch identifier as an egress switch identifier of a second frame; and
    determining the first switch as egress switch for the frame in response to identifying the virtual switch identifier as the egress switch identifier of the second frame.

12. The method of claim 10, further comprising:
    identifying the virtual switch identifier as an egress switch identifier of a second frame, wherein the second frame is a broadcast, unknown unicast, or multicast frame; and
    precluding the first switch from determining a local port as output port for the frame in response to identifying the virtual switch identifier as the egress switch identifier of the frame.

13. The method of claim 10, further comprising:
    identifying a second frame to be a broadcast, unknown unicast, or multicast frame associated with a local end device; and
    assigning a virtual root switch identifier as an egress-switch field of the second frame with a virtual root switch identifier, wherein the virtual root switch identifier is associated with a multicast root switch of the first network of interconnected switches and a multicast root switch of the second network of interconnected switches.

14. The method of claim 13, further comprising:
    identifying a new multicast root switch in response to detecting unavailability of the multicast root switch of the first network of interconnected switches; and
    associating the virtual root switch identifier with the new multicast root switch of the first network of interconnected switches.

15. The method of claim 10, wherein the first switch is configured in accordance with one of:

a Transparent Interconnection of Lots of Links (TRILL) protocol; and
an Internet Protocol (IP).

16. The method of claim 15, further comprising:
precluding the first switch from removing an encapsulation header of an encapsulated frame in response to determining the encapsulated frame to be a broadcast, unknown unicast, or multicast frame; and
determining a first edge port as the output port for the encapsulated frame, wherein the first edge port is configured as an output port for frames destined outside of the first network of interconnected switches.

17. The method of claim 10, further comprising:
disassociating the first switch from the virtual switch identifier upon detecting unavailability of the second switch; and
assigning a switch identifier of the first switch as an egress-switch field of a second frame, wherein the second frame is received after detecting the unavailability of the second switch.

18. The method of claim 10, further comprising:
running a control plane associated with the first network of interconnected switches; and
controlling the network of interconnected switches via the control plane.

* * * * *